(12) United States Patent
Minghetti

(10) Patent No.: US 6,929,141 B1
(45) Date of Patent: Aug. 16, 2005

(54) SYSTEM FOR THERMOFORMING SHEET MATERIAL TO OBTAIN CONTAINERS THEREFROM

(75) Inventor: Bianca Elena Minghetti, Reggio Emilia (IT)

(73) Assignee: Green Pack S.r.l., Reggio Emilia (IT)

( * ) Notice: Subject to any disclaimer, the term of this patent is extended or adjusted under 35 U.S.C. 154(b) by 0 days.

(21) Appl. No.: 10/129,917

(22) PCT Filed: Nov. 9, 2000

(86) PCT No.: PCT/IB00/01629

§ 371 (c)(1),
(2), (4) Date: May 10, 2002

(87) PCT Pub. No.: WO01/34494

PCT Pub. Date: May 17, 2001

(30) Foreign Application Priority Data

Nov. 10, 1999 (IT) .............................. MO99A0248

(51) Int. Cl.⁷ ............................................ B65D 21/02
(52) U.S. Cl. ................... 220/23.86; 220/507; 220/23.8
(58) Field of Search ...................... 220/23.83, 23.86, 220/507, 555, 23.8, 23.2, 4.27, 4.26, 4.24, 220/4.21, 4.13, 4.12, 679, 678, 62.22, 62.12, 220/62.11; 53/410, 453; 215/6, 12.1, DIG. 8

(56) References Cited

U.S. PATENT DOCUMENTS

| 3,948,017 A | 4/1976 | Faller |
| 4,700,835 A | 10/1987 | Rognsvoog, Jr. |
| 5,201,163 A | 4/1993 | Reil et al. |
| 5,388,757 A * | 2/1995 | Lorenzen ................. 229/123.3 |

FOREIGN PATENT DOCUMENTS

| DE | 29 33 043 | 3/1981 |
| DE | 40 10 428 | 10/1991 |
| EP | 0 692 364 | 1/1996 |
| WO | WO 97/33741 | 9/1997 |

* cited by examiner

Primary Examiner—Stephen Castellano
(74) Attorney, Agent, or Firm—Collard & Roe, P.C.

(57) ABSTRACT

An apparatus comprises indexing means (75) arranged for indexing sheet material (1) along an advancing direction (F) through a forming station (5) in which shells (50, 50a, 50b) of containers (53, 54, 55, 56, 80) joined by undeformed parts of said sheet material (1) are obtained, a filling station (7, 7a) in which said shells are filled with product (52), a shearing station (11) in which said shells (50, 50a, 50b) are severed from said sheet material (1); a method comprises forming sheet material (1) deforming portions thereof so as to obtain shells (50, 50a, 50b) of containers, filling said shells (50, 50a, 50b) with product (52), shearing said shells (50, 50a, 50b) severing them from said sheet material (1); a container comprises a first part of container (50) and a second part of container (50) between which interposing (20) means is peelably interposed.

20 Claims, 7 Drawing Sheets

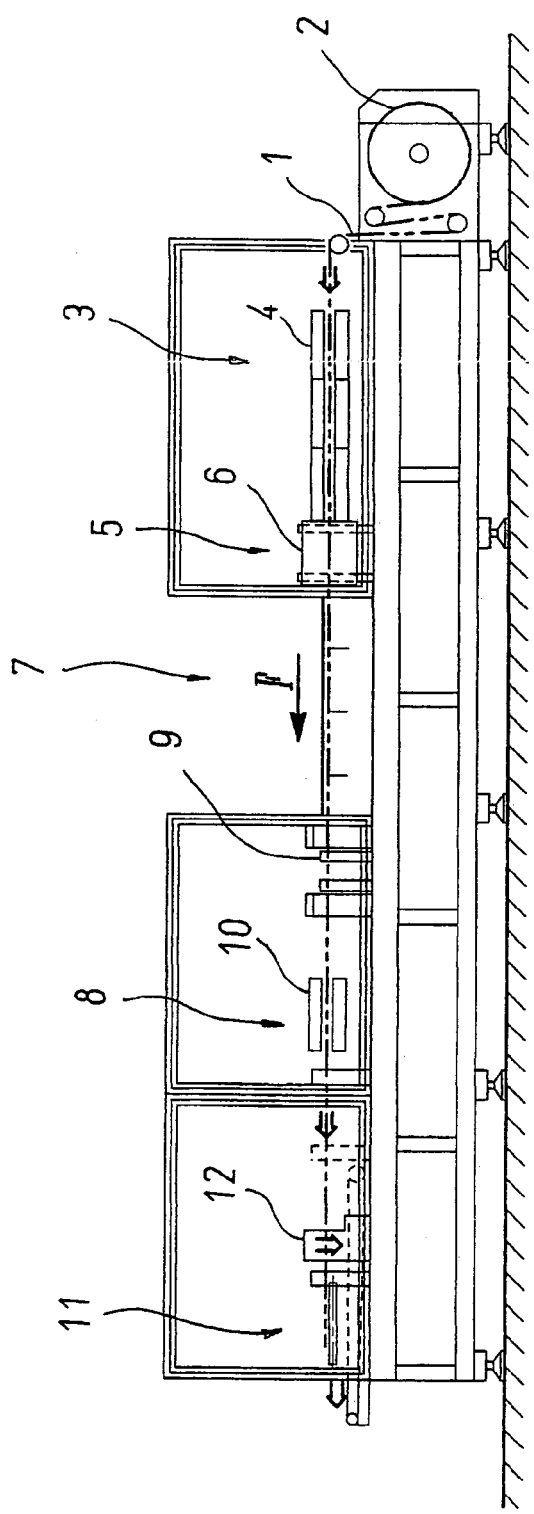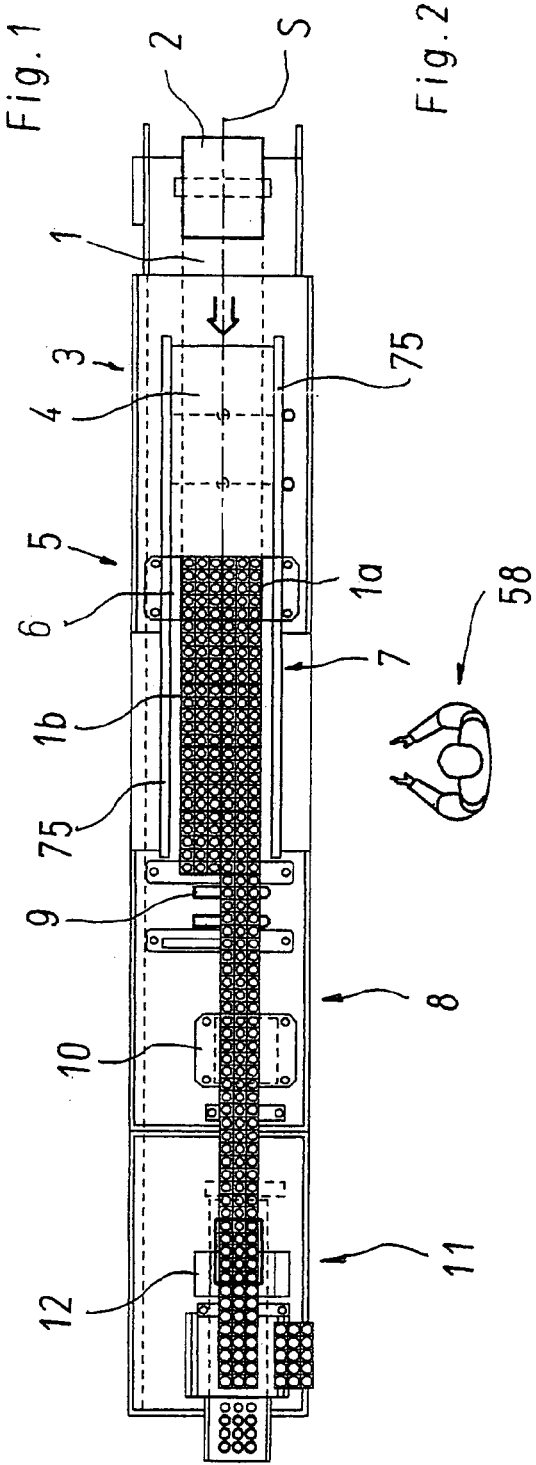
Fig. 1
Fig. 2

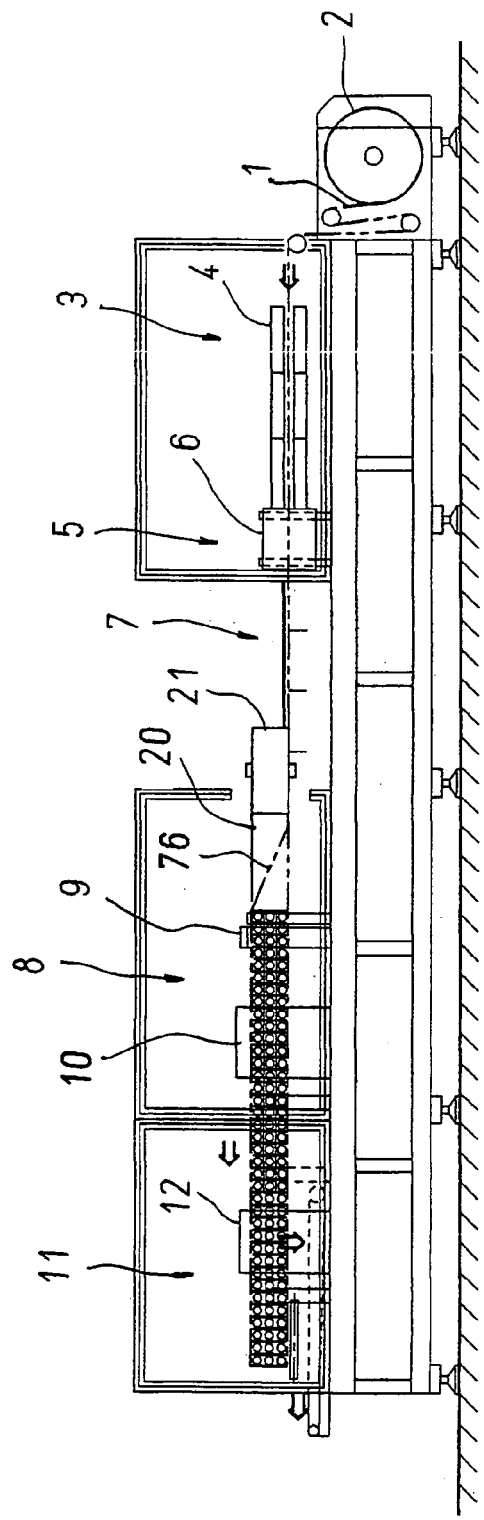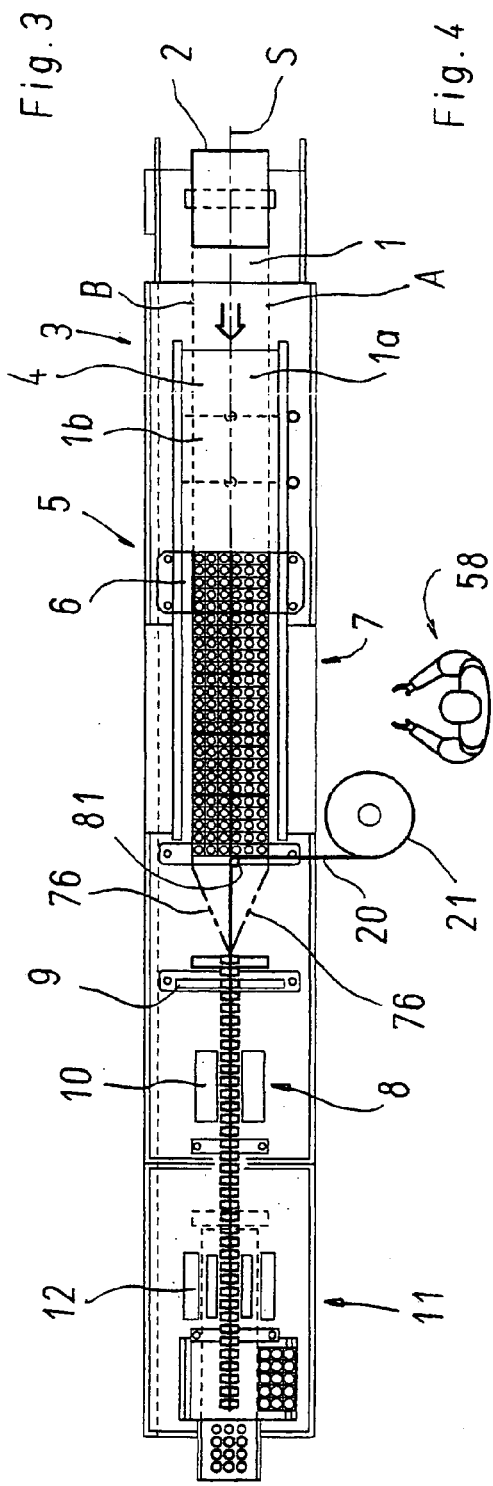

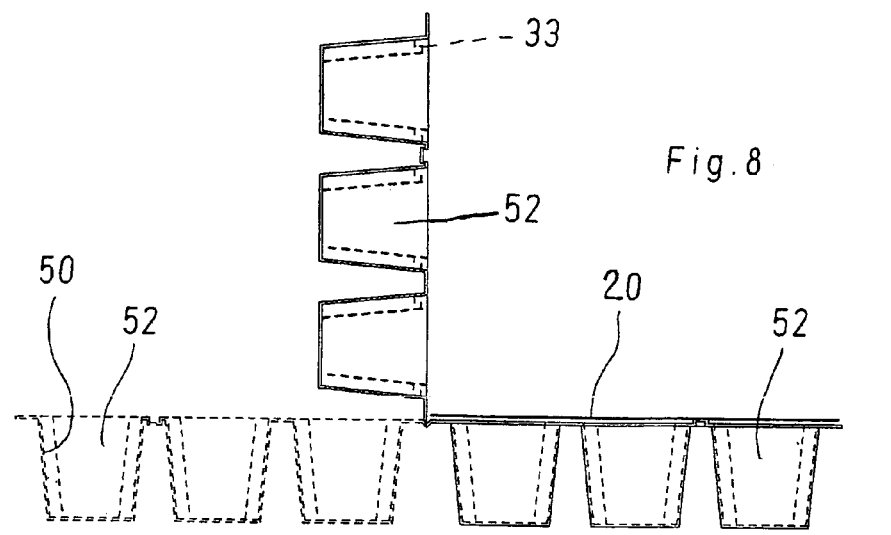
Fig. 8
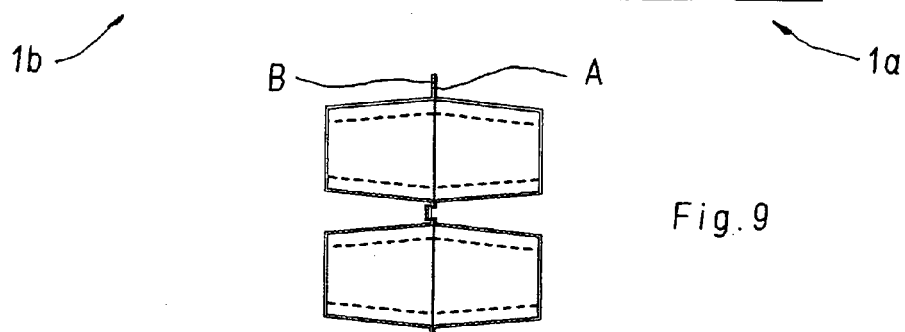
Fig. 9
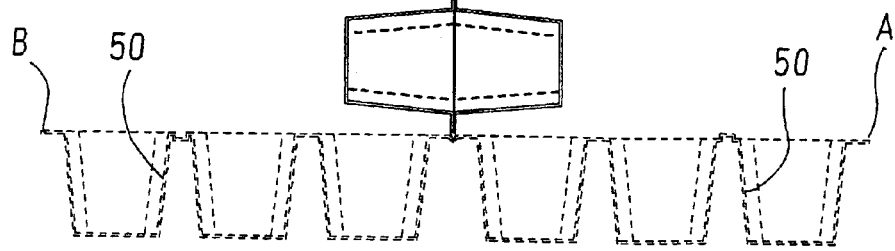
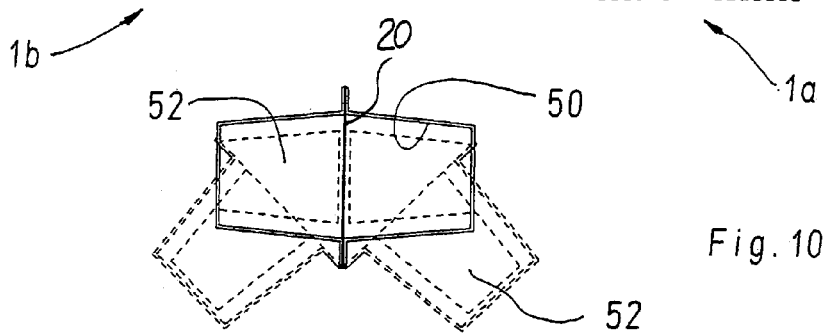
Fig. 10

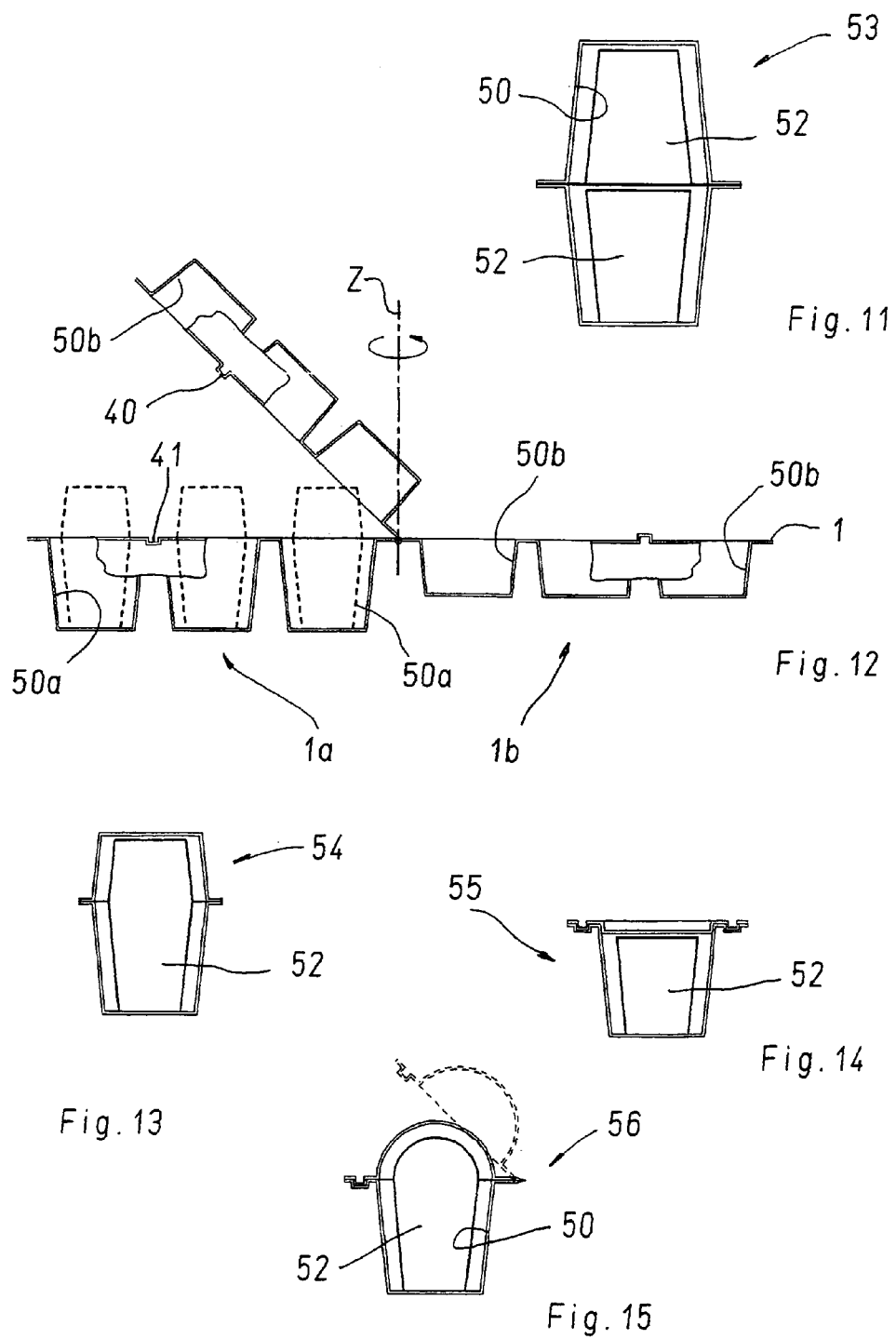

SYSTEM FOR THERMOFORMING SHEET MATERIAL TO OBTAIN CONTAINERS THEREFROM

CROSS REFERENCE TO RELATED APPLICATIONS

Applicant claims priority under 35 U.S.C. §119 of Italian Application No. M099A000248 filed Nov. 10, 1999. Applicant also claims priority under 35 U.S.C. §120 of PCT/IB00/01629 filed Nov. 9, 2000. The international application under PCT article 21(2) was published in English.

The invention relates to apparatus, method and container for products, in which thermoforming, filling and joining shells obtained from deformation of a sheet of plastic material are provided.

Prior art comprises thermoformed containers for products comprising a base, in which a main portion of product is contained and a lid coupled to the upper peripheral edge of the base by means of welding, or by means of mechanical coupling elements, such as clamps, snap fixing elements, or other.

The base and the lid may be substantially equal, or different, to each other the lid being usually less deep than the base. In such containers, the lid and the base may be thermoformed adjacent to each other and joined together by means of a thin strip of plastic material acting as an elastic hinge providing a rotation suitable for allowing the lid to be brought onto the base.

The apparatus for the manufacturing of the above mentioned containers comprises a first thermoforming machine, comprising an indexing system for indexing a sheet of plastic material which is caused to pass through a preheating station and subsequently in a forming station in which the sheet is plastically deformed to obtain therefrom a plurality of upper parts of container. In a second thermoforming machine analogous to the first thermoforming machine a plurality of lower parts of container obtained from another sheet of plastic material is thermoformed so as these lower parts of containers may be coupled to the above mentioned upper parts of container obtained by means of the first thermoforming machine.

However, before the aforesaid lower parts of container are coupled to the upper parts of container, the lower parts of container have to be filled with product, which took place in a filling station arranged outside of both the first and the second thermoforming machine.

Such apparatuses are very cumbersome and have a very low productivity, mainly since the sheets have to be conveyed in the above-mentioned way so causing remarkable loss of time.

In the aforesaid apparatuses, the upper parts of container may be thermoformed from a sheet of material different from the material from which the lower parts of container are thermoformed.

Since the two sheets may have different shrinkages, it is possible that, when the sheets are superimposed to each other in order to weld the respective coupling edges, said coupling edges do not match so making the positioning step before welding very difficult, and, if worse comes to worst, the formed containers unacceptable.

In further known thermoforming machines a sheet of plastic material is thermoformed to obtain lower parts of container each of which is juxtaposed to the upper part of container intended to act as a lid for said lower part and joined to the upper part by a portion of the sheet. After forming, the lower parts of container, each with the upper portion of container associated thereto, are severed from the sheet in a shearing station, filled and finally the upper part of container is brought onto the lower part folding the portion of the sheet like a hinge; the containers so obtained are transferred to the subsequent welding step.

This method is rather complicated since, although lid and base of the container may be obtained from the same portion of sheet, said method does not allow the containers to be filled and welded in the same machine in which the forming has taken place, on the contrary, before filling, the containers may be severed from the sheet.

Furthermore, in the known thermoformed containers, when the part acting as a lid is removed from the other part, the whole content becomes accessible and so rapidly perishable if it is sensitive to the external environment.

An object of the present invention is to improve forming of sheet material.

U.S. Pat. No. 5,201,163 discloses a method of producing a package made of a synthetic plastic material, comprising:
  advancing a first web of synthetic plastic material;
  forming on said first web a pair of complementally configured open tub-shaped containers;
  advancing a second web of plastics material parallel to said first web;
  filling the tub-shaped containers with flowable content;
  bringing the first and second webs into overlying contact with each other, so that the second web covers the open containers, and welding the second web to the first web;
  cutting the second web of plastic material and the containers sealed thereto transversely to a direction of advance;
  folding the pair of sealed complementally configured containers so as to bring the portions of the second web of plastics material which seal the containers into abutting juxtaposition.

A further object is to provide an apparatus for forming, filling and subsequently welding containers obtained from sheet material.

A still further object is to improve the known containers, particularly to improve level of protection of the content.

In a first aspect of the invention, an apparatus is provided, comprising a forming station for forming sheet material in which forming means is provided suitable for deforming portions of said sheet material so as to obtain shells of containers joined by not deformed parts of said sheet material, a shearing station in which said shells are severed from said sheet material, characterized in that between said forming station and said shearing station a filling station is interposed in which said shells are filled with product.

Between said filling station and said shearing station is interposed a joining station in which sheet material is joined to the edges of said shells, said sheet material causing the product to be isolated from the outside.

Preferably, said sheet material shows an intended folding line extending parallelly to an advancing direction of said sheet material.

Said portions may define first parts of container arranged on one side of said intended folding line.

Furthermore, second parts of container may be defined in said portions on the opposite side of said intended folding line.

In this way, base body of containers may be formed, for example, from said first parts of containers and lids of container from said second parts of container, said base body being filled with objects to be packaged.

After forming, said sheet material is folded along said intended folding line, so that said first parts and said second parts are caused to match together, and then to undergo the subsequent joining step and shearing step.

Therefore, each container is constituted by a first part of container joined along a peripheral edge thereof to a second part of container.

In a second aspect of the invention, a method is provided comprising forming sheet material deforming portions thereof so as to obtain shells of containers joined by undeformed parts of said sheet material, shearing said shells severing them from said sheet material, characterized in that before said shearing filling said shells with product is provided.

Owing to these aspects of the invention, productivity may be increased and encumbrances may be drastically reduced.

In a third aspect of the invention, a container having wall means obtained from sheet material is provided comprising a first part of container having a first peripheral edge region and a second part of container having a second peripheral edge region, said first part of container being joined at its first peripheral edge region to the second peripheral edge region of said second part of container, characterized in that interposing means is interposed between said first peripheral edge region and said second peripheral edge region so as to define a first chamber in said first part of container and a second chamber in said second part of container.

Preferably, said interposing means comprises further sheet material removably joined to at least one peripheral edge region selected between said first peripheral edge region and said second peripheral edge region.

Advantageously, said interposing means is peelably welded to one, or both, of said first peripheral edge region and said second peripheral edge region.

Therefore, the peelable welding which joins the interposing means to the first peripheral edge region may be stronger than the peelable welding which joins the interposing means to the second peripheral edge region. In this way, when the first part of container and the second part of container are removed from each other to open the container, the interposing means is still kept connected to the first part of container, so ensuring protection of the content.

Owing to this aspect of the invention, the container may be opened during subsequent steps, at least part of the content being kept protected, if an immediate use thereof is not required.

The invention will be better understood and carried out with reference to the attached drawings, which show some exemplifying and not restrictive embodiments thereof, in which:

FIG. 1 is a front view of an apparatus according to the invention;

FIG. 2 is a plan view of the apparatus according to the invention shown in FIG. 1;

FIG. 3 is a front view of a second version of an apparatus according to the invention;

FIG. 4 is a plan view of the second version of an apparatus according to the invention shown in FIG. 3;

FIG. 8 is a cross section of the formed film, in a sequence in which the film is folded along a longitudinal middle line in the version of apparatus shown in FIG. 5;

FIG. 9 is a cross section of the formed film, in a sequence in which the film is folded along a longitudinal middle line in the version of apparatus shown in FIGS. 5 and 6;

FIG. 10 is a an enlarged and sectioned detail of a container severed from the film of FIG. 9;

FIG. 11 is an enlarged and sectioned detail of a container severed from the film of FIG. 8;

FIG. 12 is a partially broken sequential cross section of the formed film during folding showing keeping means suitable for keeping two halves of the sheet materials folded on each other in a correct relative position;

FIG. 13, FIG. 14, FIG. 15 and FIG. 17 are cross sections of further versions of container;

FIG. 18 is a left side view of the container of FIG. 17;

Figure 16:
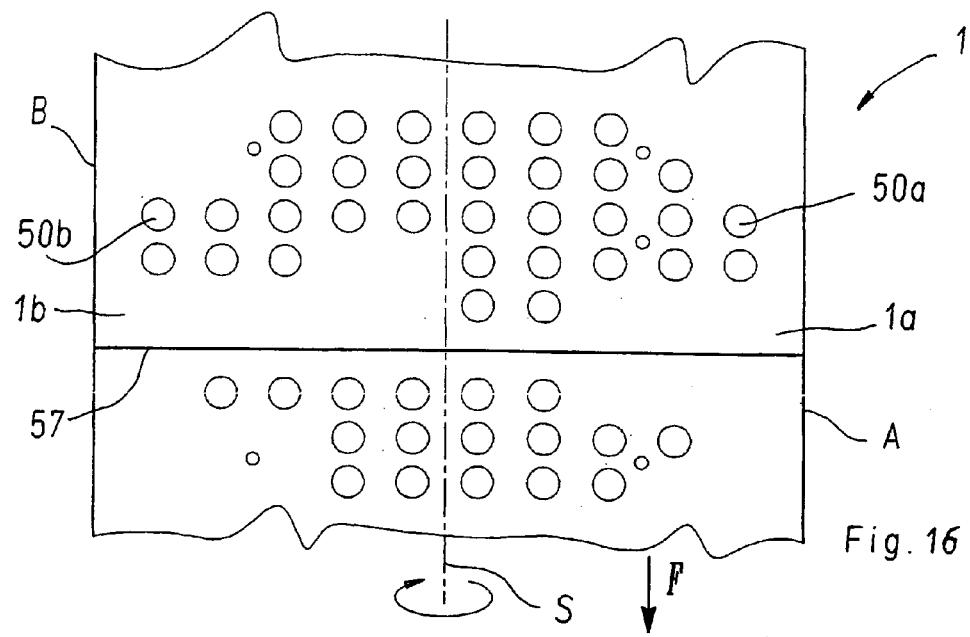
FIG. 16 is a plan view of a longitudinal portion of the formed film.

As shown in FIGS. 1, 2 and 16, a thermoformable film material 1 is unwound from a reel 2 and is indexed by means of indexing means 75 along an advancing direction F through the stations listed here below:

a heating station 3 in which heating means 4 heats the film up to a temperature near to the softening point;

a forming station 5 in which forming means 6 deforms portions of the film 1 defining cavities 50 (FIG. 8) having a desired shape;

a filling station 7 in which the cavities 50 receives products 52 to be packaged;

a welding station 8 in which welding means 10 closes the cavities 50 containing the products 52; and a shearing station 11 in which shearing means 12 severs formed, filled and closed containers 53, 54, 56, 80 (FIGS. 11, 13, 14, 15, 17) from the film 1.

The forming means 6 may comprise mechanical forming means, such as drawing means, and/or pneumatic forming means, such as pressurized air delivering nozzles, or sucking nozzle suitable for vacuum forming, or other.

Figure 20:
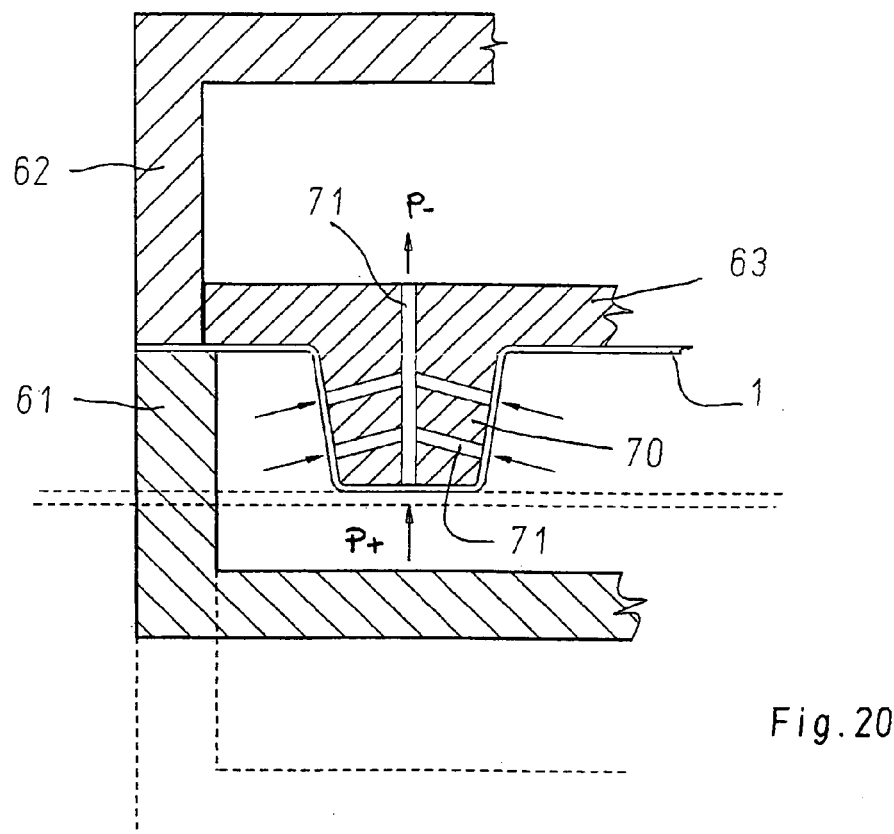
FIG. 20 is an enlarged and sectioned detail of forming means.
Figure 21:
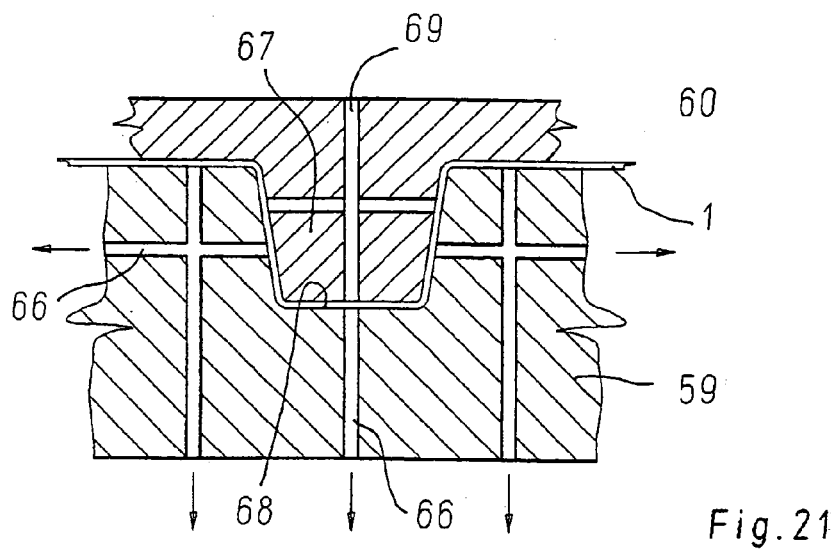
FIG. 21 is a detail as in FIG. 20 showing another version of the forming means.

In FIG. 21 forming means is shown comprising male forming means 60 provided with protrusions 67 insertable into recesses 68 of female forming means 59 in which holes 66 suitable for allowing air discharge are provided. The film to be formed is interposed between the male forming means 60 and the female forming means 59. Conduits 69 are obtained in the protuberances 67 suitable for introducing compressed air through the male forming means 60 for making the film adhere to the recesses 68. In FIG. 20 forming means is shown comprising lower case means 61, upper case means 62 and punch means 63. The lower case means 61 and the upper case means 62 clench against opposed faces of a part of the film 1 to be formed. The punch means 63 are slidable at the inside of the upper case means 62 so as to be able to be moved toward, and to be removed from, the film 1 to deform the film 1 causing the film 1 to adhere to appendices 70 which the punch means is provided with. The punch means is provided with openings 71 through which air is sucked, so as to help adhesion of the film 1 to the punch means 63; in order to further help this adhesion, a positive pressurized forming fluid, for example air, is introduced into the region defined by the lower case means 61 and the film 1, in this way the air presses the film against the walls of the punch means 63 causing the film to take the desired shape on.

The film 1 is ideally crossed by a line S arranged parallelly to the advancing direction F, said line S longitudinally dividing the film 1 into a first part 1a of film and a second part 1b of film, the first part 1a and the second part 1b being adjacent to each other. The line S may be a folding ideal line, or an incision obtained on the film 1 in order to help folding thereof bringing a part of the film onto the other, or both parts to a joining plane as it will be better described hereinafter.

As shown in FIGS. 8 and 9, the film 1, after being formed, may comprise in the first part 1a of film and in the second part 1b of film cavities 50 substantially equal to each other, or first cavities 50a in the first part 1a of film different from second cavities 50b in the second part of film 1b (FIGS. 12, 13, 4 and 15).

Therefore, a plurality of first cavities 50a may form a plurality of bases of container adjacent to each other, while a plurality of second cavities 50b may form a corresponding plurality of lids of container adjacent to each other. The Line S is a folding line along which the film 1 is folded, by means of folding means 9, to bring the plurality of second cavities 50b of container onto the plurality of first cavities of containers 50a.

As shown in FIG. 16, before the folding means 9 rotates the second part 1b of film of 180° around the line S to bring the second part 1b of film onto the first part 1a of film, the film 1 is partially cut along a line 57 transversal with respect to the advancing direction F, said line 57 crossing the second part 1b of film up to the intersection of the transversal line 57 with the folding line S.

Between the forming station 5 and the folding means 9 the filling station 7 is interposed in which the thermoformed bases 50a of container are filled with product 52; the filling may be automatic or may be performed manually by an operator 58. In the shearing station 11, the thermoformed, filled and closed containers 53, 54, 55, 56, 80 are severed from the film 1 by means of shearing means 12, the shearing means 12 may comprise shaped heated hollow punches, blanking-dies, or longitudinal and transversal cutting blades.

In the version of apparatus shown in FIGS. 3 and 4, a further film 20 is interposed between the first part 1a of film and the second part 1b of film before the welding station 8 so that the further film 20, after welding, is joined to both the first part 1a of film and the second part 1b of film. Advantageously, said further film 20 is peelably welded to the first part 1a of film and to the second part 1b of film and, more in detail, the peelable welding which joins the further film 20 to the first part 1a of film is stronger than the peelable welding which joins the further film 20 to the second part 1b of film.

In FIG. 3 a filling station 7 is shown, in which all the cavities 50 obtained in the first part 1a of film and in the second part 1b of film are filled with objects 52; downstream of the filling station 7 a reel 21 on which the further film 20 is wound is placed, said reel 21 being arranged with its axis perpendicular to the film 1. The film 1 is folded by deviating means 76 rotating the first part 1a of film and the second part 1b of film around the folding line S and simultaneously lifting the two extreme edges A and B of the film 1 to join said edges A and B along a common vertical plane passing through the folding line S; before the folding of the film 1 is completed, the further film 20 which is drawn from the reel 21 already arranged in a vertical position, is interposed between the first part 1a of film and the second part 1b of film. In greater detail, the film 20 is unwound from the reel 21 and advanced over the film 1, which is in a horizontal position, in a direction perpendicular to the advancing direction of the film 1; near the folding line S an idle roller 81 is placed around which the further film 20 is rotated causing said further film 20 to be contained in the plane passing through the line S and perpendicular to the film 1. Therefore, the film 1 and the further film 20 advance in the same direction, the further film 20 being held between the first part 1a and the second part 1b of film 1 which are rotated in opposed directions until they are placed adjacent to each other in the vertical plane passing through the line S.

Figure 6:
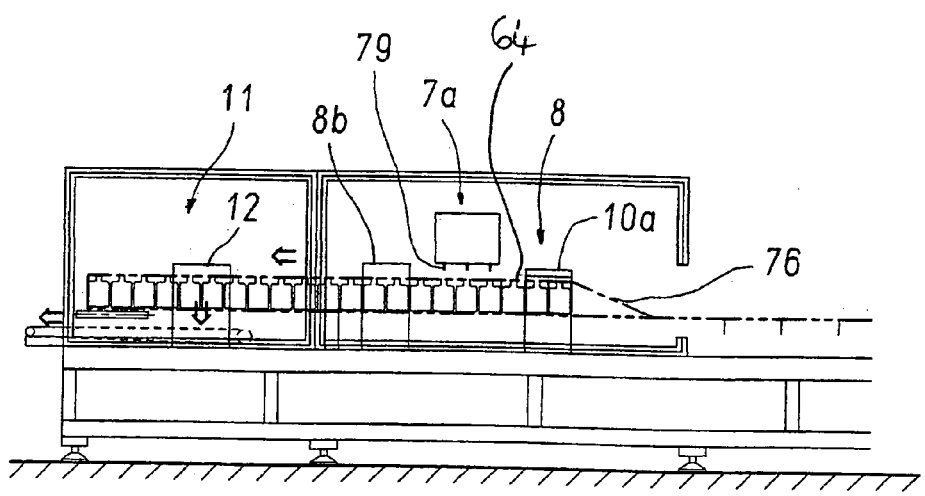
FIG. 6 is a broken plan view of a fourth version of an apparatus according to the invention.
Figure 7:
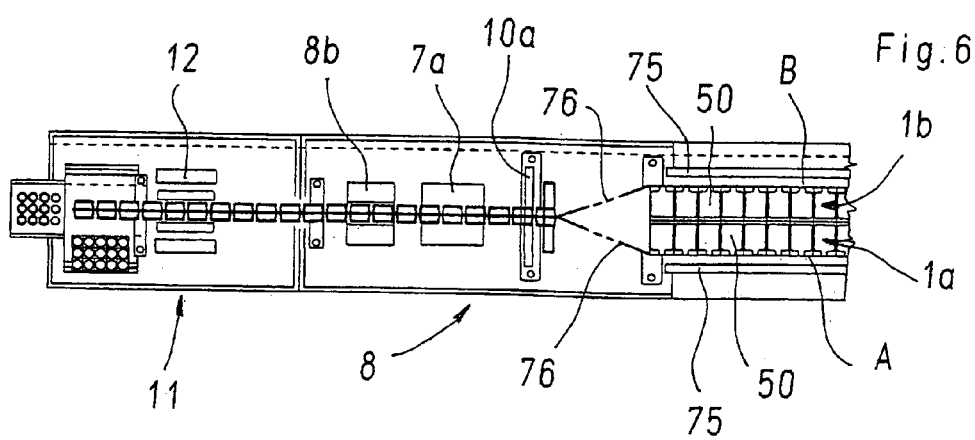
FIG. 7 is a plan view of the apparatus shown in FIG. 6.

With reference now to FIGS. 6 and 7 there is shown an apparatus for manufacturing containers substantially corresponding to the apparatus of FIGS. 3 and 4, but in which no insertion of further film 20 is provided. More particularly, the apparatus of FIGS. 6 and 7 comprises, in sequence, the stations listed hereinafter:

a heating station 3;

a forming station 5, in which longitudinally consecutive halves 50 of container 80 are formed in each part of film 1a, 1b;

a welding station 8 in which welding means 10a closes the cavities 50 to form the empty containers 80 leaving therein clear upper openings 64;

a filling station 7 in which the container 80 receive a fluid product 78, for example a liquid, to be packaged, which is introduced by means of conduits 79 insertable through the openings 64;

a further welding station 8b for closing the openings 64 so sealing the container 80;

a shearing station 11 in which shearing means 12 severs formed, filled and sealed containers from the film 1.

Figures 17, 18:
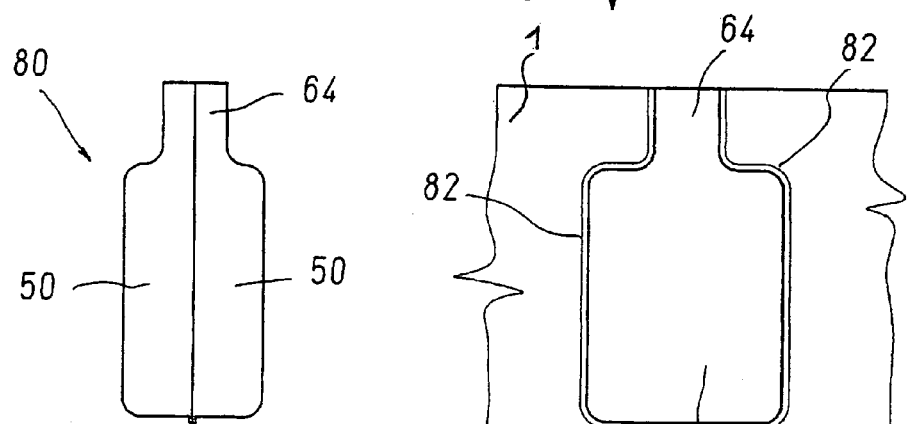
Figure 19:
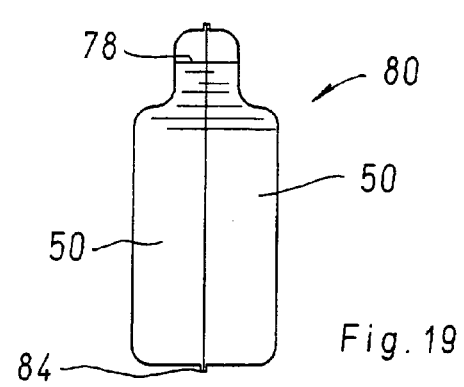
FIG. 19 is a view as FIG. 17, showing the container closed and filled with liquid.

As shown in FIGS. 18 and 19, a container 80, which is still joined to the film 1 in the filling station 7a, comprises cavities 50 peripherally joined together by a welding 82 interrupted at the opening 64 and by a hinge 84 arranged at the folding line S.

Owing to the apparatus according to the invention, walls may be obtained having a uniform thickness in each region of the container so eliminating dangerous thinning of the walls which are typical of certain known container.

Obviously, also the container 80 may be provided with two hollow spaces separated by a further film 20.

Figure 5:
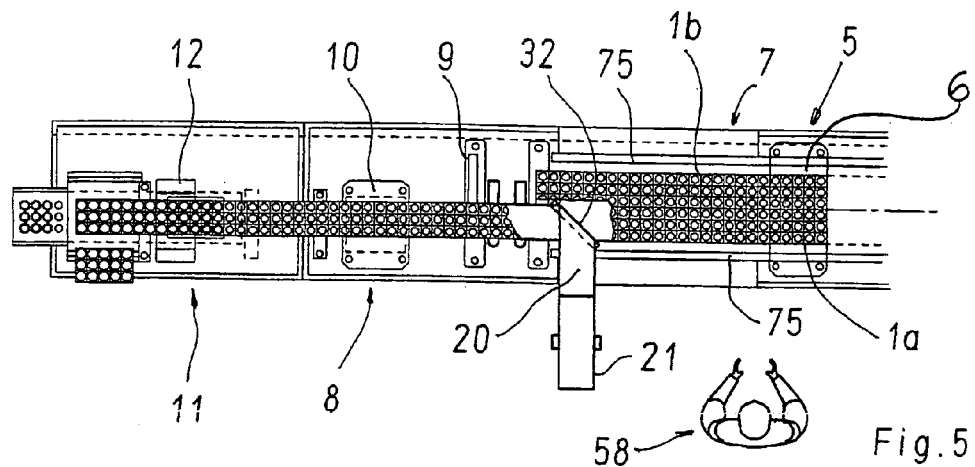
FIG. 5 is a broken plan view of a third version of an apparatus according to the invention.

FIG. 5 shows an apparatus for forming container 53, analogous to the apparatus described with reference to FIGS. 1 and 2, in which downstream of the filling station 7 a reel 21 on which the further film material 20 is wound is provided, said reel 21 being arranged, in this case, with its axis parallel to the axis S of the film 1.

The film 1, in which the cavities 50 have been obtained, arrives at a folding station 9 in which the first part 1a of film, comprising first parts of container 50, is kept horizontal, while the second part 1b of film, comprising second parts of container 50 is rotated of 180° to cause first and second part of each container to match together. Before said rotating, the film 20 is arranged, by means of return means, on the first part 1a of film which is kept in a horizontal position. The two parts of container 50 and the sheet material 20 are welded together in the following welding station 8.

During the 180° rotation the objects 52 placed inside the containers might drop; in order to avoid this drawback a mechanic stopping element 33 is provided, shown in FIG. 8, said mechanic stopping element 33 being obtained during forming. Due to the mechanic stopping element 33 the object 52 is caused to enter into the container by means of a slight pressure and is then kept in a right position during all the subsequent working operations, until the container is opened.

During forming a set of teeth 40 (FIG. 12) and a set of notch 41 are obtained in portions of film 1 mutually opposed with respect to the folding line S, for preventing the two portions of film facing each other, particularly the portions arranged far away from the folding line S, from slightly shifting with respect to each other when the first part 1*a* has been folded on the second part 1*b*. The teeth 40 and the notch 41 are suitable for engaging to each other allowing the first part 1*a* of film and the second part 1*b* of film to be kept face to face in the right position so promoting the welding thereof.

What is claimed is:

1. Container having wall means formed from sheet material, comprising a first part of container having a first peripheral edge region and a second part of container having a second peripheral edge region, said first part of container being joined at its first peripheral edge region to said second peripheral edge region, and further comprising an intermediate sheet interposed between said first peripheral edge region and said second peripheral edge region so as to define a first chamber in said first part of container and a second chamber in said second part of container, said intermediate sheet bounding, on a first face thereof, said first chamber and, on a second face thereof, said second chamber, said intermediate sheet being peelably welded to both said first peripheral edge region and said second peripheral edge region.

2. Apparatus, comprising indexing means arranged for indexing sheet material along an advance direction across a forming station of said sheet material in which forming means is provided, said forming means being arranged for forming portions of said sheet material so as to obtain shells of containers joined by undeformed parts of said sheet material, a shearing station in which said shells are severed from said sheet material, a filling station interposed between said forming station and said shearing station in which said shells are filled with product, and further comprising inserting means arranged for distributing further sheet material to close said shells, wherein said inserting means causes association of a first face of said further sheet material to one part of said sheet material to close a first group of shells in a first region of said sheet material extending along said advance direction, so that a second face of said further sheet material opposite to said first face may be associated to another part of said sheet material to close a second group of shells in a second region of said sheet material extending along said advance direction and adjacent to said first region.

3. Apparatus according to claim 2, and further comprising folding means arranged downstream of said filling station for folding said one part of said sheet material onto said another part of said sheet material along an intended folding line parallel to said advance direction.

4. Apparatus according to claim 3, and further comprising downstream of said filling station cutting means arranged for cutting said another part of sheet material along a line extending between an edge of said sheet material and said intended folding line.

5. Apparatus according to claim 2, and further comprising a deviating device arranged for folding said one part of said sheet material and said another part of said sheet material until they are joined in a common vertical plane passing through an intended folding line parallel to said advance direction.

6. Apparatus according to claim 5, wherein said deviating device is located upstream of said filling station.

7. Apparatus according to claim 2, wherein said inserting means comprises wedge means extending above said another part of sheet material.

8. Apparatus according to claim 2, and comprising further forming means for forming positioning means arranged for substantially preventing said one part of sheet material and said another part of said sheet material from shifting with respect to each other when said one part of sheet material and said another part of said sheet material are placed in contact to each other.

9. Apparatus according to claim 2, wherein said forming means comprises means for forming stopping means suitable for preventing said product from accidentally coming out from the respective shell.

10. Apparatus, comprising indexing means arranged for indexing sheet material along an advance direction across a forming station of said sheet material in which forming means is provided, said forming means being arranged for thermo-forming portions of said sheet material so as to obtain shells of containers joined by undeformed parts of said sheet material, a shearing station in which said shells are severed from said sheet material, a filling station interposed between said forming station and said shearing station in which said shells are filled with a product, said apparatus further comprising a deviating station having a deviating device for folding one part of said sheet material and another part of said sheet material until they are joined in a common plane passing through an intended folding line parallel to said advance direction, wherein said deviating station is located upstream of said filling station, said apparatus further comprising a joining station arranged downstream of said deviating station, in which said one part of sheet material and said another part of sheet material are joined together along a substantial edge part of containers to be formed.

11. Method, comprising forming sheet material advanced along an advance direction by shaping portions of said sheet material so as to obtain shells of containers joined by undeformed parts of said sheet material, filling said shells with a product and, after said filling, shearing said shells by severing them from said sheet material, and further comprising closing said shells with a further sheet material, wherein said closing comprises associating a first face of said further sheet material to a first group of shells in a first region of said sheet material extending along said advance direction and further associating a second face of said further sheet material, opposite to said first face, to a second group of shells in a second region of said sheet material extending along said advance direction and adjacent to said first region.

12. Method according to claim 11, and further comprising, after said filling, folding said one part of said sheet material onto said another part of said sheet material along an intended folding line parallel to said advance direction.

13. Method according to claim 12, wherein said folding occurs before said filling.

14. Method according to claim 12, and further comprising, after said filling, cutting said another part of sheet material along a line extending between an edge of said sheet material and said intended folding line.

15. Method according to claim 11, and further comprising folding said one part of said sheet material and said another part of said sheet material until they are joined in a common vertical plane passing through an intended folding line parallel to said advance direction.

16. Method according to claim 15, wherein said folding occurs before said filling.

17. Method according to claim 11, wherein said closing comprises placing said further sheet material above said one part of sheet material.

18. Method according claim 11, and comprising further forming positioning means arranged for substantially preventing said one part of sheet material and said another part of said sheet material from shifting with respect to each other when said one part of sheet material and said another part of said sheet material are placed in contact to each other.

19. Method according to claim 11, wherein said forming comprises forming stopping means arranged for preventing said product from accidentally coming out from the respective shell.

20. Method, comprising forming sheet material indexed along an advance direction by thermo-forming portions thereof so as to obtain shells of containers joined by undeformed parts of said sheet material, filling said shells with product and, after said filling, shearing said shells by severing them from said sheet material, and further comprising folding one part of said sheet material and another part of said sheet material until they are joined in a common plane passing through an intended folding line parallel to said advance direction, wherein said folding occurs before said filling, said method further comprising, after said folding, joining together said one part of sheet material and said another part of sheet material along a substantial edge part of containers to be formed.

* * * * *